April 19, 1955      W. W. PORTER      2,706,374
RECIPROCATING CUTTER ASSEMBLY
Original Filed Nov. 17, 1947      2 Sheets-Sheet 2
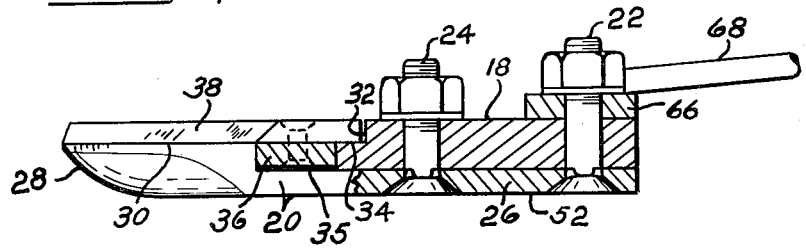
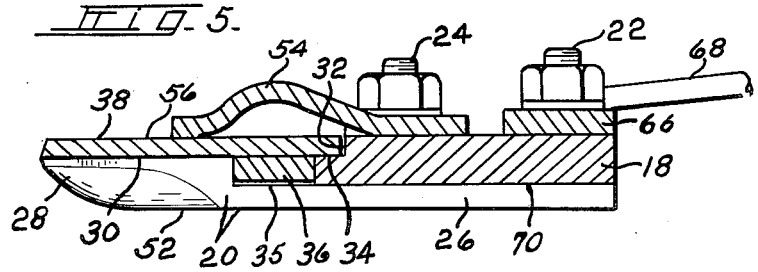
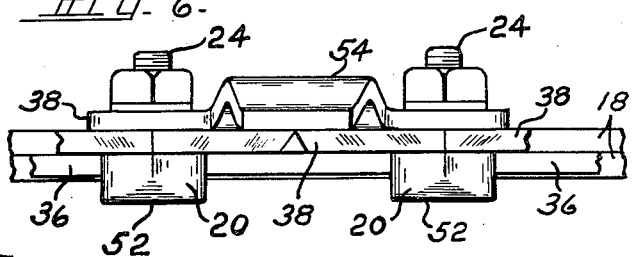
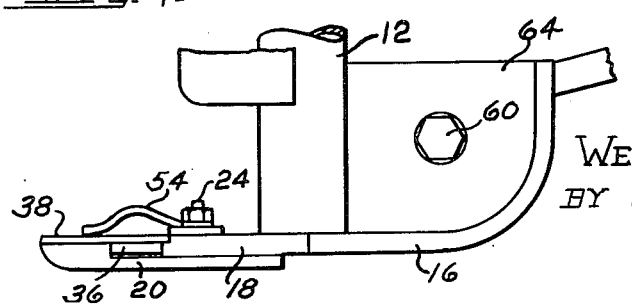
INVENTOR
WELLINGTON W. PORTER
BY
ATTORNEY 2,706,374
Patented Apr. 19, 1955

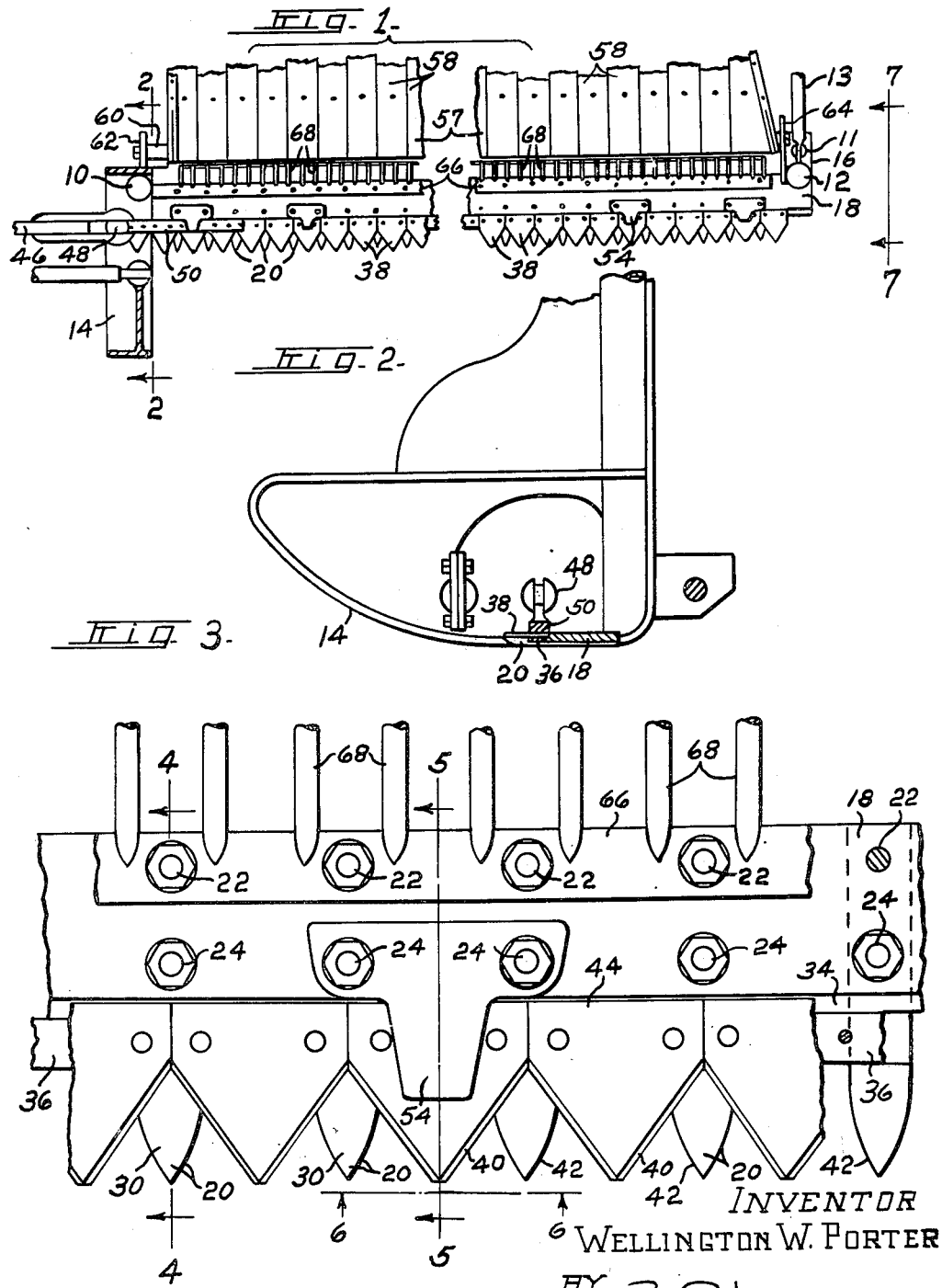

United States Patent Office

2,706,374

RECIPROCATING CUTTER ASSEMBLY

Wellington W. Porter, Waterloo, N. Y.

Original application November 17, 1947, Serial No. 786,454, now Patent No. 2,614,379, dated October 21, 1952. Divided and this application July 8, 1952, Serial No. 297,613

3 Claims. (Cl. 56—296)

This invention relates to harvesters, and more particularly to a cutter mechanism adapted for close to ground cutting of spinach and the like.

Cutters employed in conjunction with harvesters are generally adapted for cutting more than an inch above the ground. For short leaf crops, such as spinach, cutting at such a height leaves a substantial portion on the ground uncut.

The present invention is directed toward a cutter construction adapted to cut as close as 1/8" above the ground, the construction being such as to avoid fouling in dirt. The construction employs stationary cutters of a streamline shape with flat ground-engaging faces adapted to ride along upon the ground. Save for the thickness of a stationary cutter bar, and the fore and aft extending stationary cutter elements, specially adapted to sink lightly into and ride on the ground, no obstruction to the free passage of dirt over or under the cutter is present.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a top fragmentary plan view of the cutter bar assembly with parts broken away and in section, illustrating its association with the frame gathering ramp;

Figure 2 is an enlarged sectional view through the left hand support taken substantially on the line 2—2 of Figure 1;

Figure 3 is an enlarged fragmentary top plan view of the cutting bar assembly with parts broken away and shown in section;

Figure 4 is an enlarged transverse sectional view taken on the line 4—4 of Figure 3;

Figure 5 is an enlarged transverse sectional view taken on the line 5—5 of Figure 3;

Figure 6 is an enlarged fragmentary front elevational view taken from the plane indicated at 6—6 of Figure 3; and Figure 7 is an enlarged fragmentary end view of the cutter taken from the plane indicated by the line 7—7 of Figure 1.

The present invention is disclosed in my copending application Serial No. 786,454, filed November 17, 1947, now Patent No. 2,614,379 and is a division thereof, the cutter bar being a feature of the harvester there shown. Such harvester provides a warpable ramp extending from a rear frame to a universally mounted forward cutter bar support which structure is adapted to permit the cutter bar to ride at all times as close as possible to the ground and to accommodate itself to irregularities. The bar may lift at one end or the other to accommodate high spots without lifting the entire bar. Thus irregularities at one end do not disturb the close cutting at the other. Since spinach is grown in sandy, relatively level soil, such universal mounting of the cutter bar permits it to accommodate itself to the slight inclines encountered and allows cutting close to the ground along its entire length.

Referring to Figure 1, there is shown upright frame members 10 and 12, which are universally supported by links forward of the carriage proper, as is disclosed in the aforementioned application. One such link, universally connected as at 11 to member 12 is shown at 13. Such frame members extend upwardly from shoes 14 and 16 at opposite ends, the shoes being joined by a long stationary cutter support bar 18. The various parts, including the bar 18, shoes 14 and 16, and members 10 and 12, may be suitably welded together as may be desired.

The bar 18 has secured to it, on the under side, a plurality of stationary cutter shoe elements 20, each of which is bolted to the bar 18 at two points as at 22 and 24, to secure each element in place at right angles to the bar 18. Each of the cutter elements has a rear shank portion 26 of uniform rectangular cross section, and a forward pointed portion 28 of increased vertical thickness, the top surface 30 of which forward portion is flat. The cutter elements may be referred to as having blocked out portions to form the shank portions 26. The bar 18 is provided with an offset step 32 along its forward edge, the upper surface 34 of which is coplanar with the surfaces 30 of the cutter elements 20. The forward portion of said cutter elements, however, is spaced from the forward edge of the bar 18, to provide a rectangular channel or guide way 35 to receive a reciprocating cutter bar 36. The cutter or blade bar 36 is provided with a plurality of like blade elements 38 riveted thereto, the inclined forward edges 40 of which cooperate with the cutting edges 42 of the flat surfaces 30 of the elements 20 to form a multiple shear. The heel portion 44 of each of the cutter blade elements rides on the offset surface 34, it being understood that the cutter bar 36 is rapidly reciprocated with the cutter elements 38 across the stationary cutter elements 20, by the usual crank (not shown) acting through the pitman 46 and a swivel joint 48 to the connecting arm 50 secured to the cutter elements 38.

The stationary cutter elements, each secured by two bolts 22 and 24, as described, are rigidly and individually held, independent of one another, and at right angles to the cutter bar 18. Such elements have a flat ground-engaging surface 52 extending over the major part of their length, and are adapted to ride on the ground surface, lightly embedded to the extent of the thickness of the shank portion 26.

Adjacent pairs of bolts 24 are utilized to secure cutter blade finger members 54 in place with the forward extending blade-engaging fingers in sliding engagement with the upper surface 56 of every fourth blade, or oftener, if desired. Such fingers exert due pressure on the cutter blades to assure proper cutting action between the blades 38 and elements 20.

The forward end of the cutter elements are preferably hardened to Rockwell C, while the shank portion is hardened to a lesser amount to assure good wear characteristics and toughness.

The cutter assembly precedes a ramp 57 composed of slats 58 loosely mounted on a support rod 60 extending from brackets 62 and 64 projecting rearwardly from columns 10 and 12. Suitable means not shown herein are adapted to move cuttings up the ramp. In order to bridge the gap between the bar 18 and the ramp 57, there is secured along the rear edge under the bolts 22 a grate or grid formed of a transverse member 66 to which are secured as by welding, a plurality of bars or rails 68, inclined upwardly toward the ramp 57.

It will be seen that the sole obstruction of the cutting assembly in moving over the ground is constituted by the thickness of the bar 18, which in practice need not exceed a half inch. The blades 38 and bar 36 lie within planes projected forward from the top and bottom surfaces of the bar 18. In practice, the column members may be tilted forwardly slightly to cause the tips of the cutter blades of the cutter assembly to cut as close as 1/8" from the ground, although a normal cut would be the height of the cutting surface 30 above the under surface 70 of the bar 18, or about 1/4", assuming the elements 20 sink slightly in the ground in traveling across the field. Any dirt, stones or other matter riding over the top of the blades may drop through the spaces between the grill bars 68. No obstruction to the forward movement of the cutter assembly exists other than the bar 18, which is preceded by the reciprocating cutter blade assembly and the runner or ground-engaging surfaces of the cutter elements.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A cutter assembly for spinach harvesters comprising a transverse bar of elongated rectangular section having an offset step extending the length thereof in its forward edge and upper surface, a plurality of cutter shoe elements, each of said elements being of substantially uniform width throughout their length, and of substantially rectangular section with the top surface thereof being pointed at the forward end to form a cutting surface and being blocked out to form a shank over the rear half thereof to a depth equal to the thickness of the forward edge of said bar below said step, said cutter shoe elements having their shanks secured to the under face of said bar in uniformly spaced relation by fastening means spaced transversely across said bar and lengthwise of said shanks, and with the blocked out portion extending forwardly of the forward stepped edge of said bar to provide a guide way, said cutting surfaces being coplanar with the offset step, a blade bar mounted for reciprocation along said transverse bar and lying above the forward portion of said shanks and forward of said edge and within the guide way, and below said cutting surfaces, a plurality of cutter blades secured to said blade bar having forwardly extending cutter portions slidably disposed on said cutting surfaces and coacting therewith and having a heel portion extending rearwardly of said blade bar and slidably disposed on said step, said cutter blades extending forwardly to the pointed ends of said cutter elements, means for reciprocating said blade bar, and means carried by the transverse bar at spaced intervals and bearing on a plurality of cutting blades for maintaining said cutting blades in cutting engagement with said cutting surfaces.

2. A cutter assembly for spinach harvesters comprising a transverse bar of elongated rectangular section having an offset step extending the length thereof, in its forward edge and upper surface, a plurality of cutter shoe elements, each of said elements being of substantially uniform width throughout their length, and of substantially rectangular section with the top surface thereof being pointed at the forward end to form a cutting surface and being blocked out to form a shank over the rear half thereof to a depth equal to the thickness of the forward edge of said bar below said step, said cutter shoe elements having their shanks secured to the under face of said bar in uniformly spaced relation by forward and rearward threaded fastening means spaced transversely across said bar and lengthwise of said shanks, and with the blocked out portion extending forwardly of the forward stepped edge of said bar to provide a guide way, said cutting surfaces being coplanar with the offset step, a blade bar mounted for reciprocation along said transverse bar and lying above the forward portion of said shanks and forward of said edge and within the guide way, and below said cutting surfaces, a plurality of cutter blades secured to said blade bar having forwardly extending cutter portions slidably disposed on said cutting surfaces and coacting therewith and having a heel portion extending rearwardly of said blade bar and slidably disposed on said step, said cutter blades extending forwardly to the pointed ends of said cutter elements, means for reciprocating said blade bar, resilient fingers affixed to the top side of the transverse bar and bearing on a plurality of cutting blades for maintaining said cutting blades in cutting engagement with said cutting surfaces, said fingers being secured to the transverse bar by certain of said forward threaded fastening means.

3. A cutter assembly for spinach harvesters comprising a transverse bar of elongated rectangular section having an offset step extending the length thereof in its forward edge and upper surface, a plurality of cutter shoe elements, each of said elements being of substantially uniform width throughout their length, and of substantially rectangular section with the top surface thereof being pointed at the forward end to form a cutting surface and being blocked out to form a shank over the rear half thereof to a depth equal to the thickness of the forward edge of said bar below said step, said cutter shoe elements having their shanks secured to the under face of said bar in uniformly spaced relation by forward and rearward threaded fastening means spaced transversely across said bar and lengthwise of said shanks, and with the blocked out portion extending forwardly of the forward stepped edge of said bar to provide a guide way, said cutting surfaces being coplanar with the offset step, a blade bar mounted for reciprocation along said transverse bar and lying above the forward portion of said shanks and forward of said edge and within the guide way and below said cutting surfaces, a plurality of cutter blades secured to said blade bar having forwardly extending cutter portions slidably disposed on said cutting surfaces and coacting therewith and having a heel portion extending rearwardly of said blade bar and slidably disposed on said step, said cutter blades extending forwardly to the pointed ends of said cutter elements, means for reciprocating said blade bar, resilient fingers affixed to the top side of the transverse bar and bearing on a plurality of cutting blades for maintaining said cutting blades in cutting engagement with said cutting surfaces, said fingers being secured to the transverse bar by certain of said forward threaded fastening means, and a grid comprising a plurality of spaced parallel rearwardly extending rails affixed to the top side of the transverse bar, said grid being secured to the bar by the rearward threaded fastening means.

References Cited in the file of this patent

UNITED STATES PATENTS

| Number | Name | Date |
|---|---|---|
| 15,205 | Wagner | June 24, 1850 |
| 93,448 | Johnson | Aug. 10, 1869 |
| 173,851 | Freeman | Feb. 22, 1876 |
| 212,637 | Weaver | Feb. 25, 1879 |
| 282,749 | Miller | Aug. 7, 1883 |
| 338,479 | Campbell et al. | Mar. 23, 1886 |
| 572,728 | Shepherd | Dec. 8, 1896 |
| 594,021 | Kane | Nov. 23, 1897 |
| 678,766 | Robbin | July 16, 1901 |
| 771,101 | Silor | Sept. 27, 1904 |
| 856,269 | Latimer | June 11, 1907 |
| 1,543,472 | Denton | June 23, 1925 |
| 2,511,841 | Gaterman | June 20, 1950 |

FOREIGN PATENTS

| Number | Country | Date |
|---|---|---|
| 278,906 | Germany | Oct. 7, 1914 |